United States Patent
Zettler

[15] 3,688,387
[45] Sept. 5, 1972

[54] SHUTTLE TYPE AUTOMATIC TOOL CHANGER

[72] Inventor: William D. Zettler, Fond du Lac, Wis.

[73] Assignee: Giddings & Lewis, Inc., Fond du Lac, Wis.

[22] Filed: Feb. 17, 1970

[21] Appl. No.: 12,158

[52] U.S. Cl. ................................................29/568
[51] Int. Cl. ...........................................B23q 3/157
[58] Field of Search...........................29/568, 26 A

[56] References Cited

UNITED STATES PATENTS

| | | | |
|---|---|---|---|
| 3,412,459 | 11/1968 | Hollis | 29/568 |
| 3,218,706 | 11/1965 | Zankl et al. | 29/568 |
| 3,443,310 | 5/1969 | Burroughs et al. | 29/568 |
| 3,266,141 | 8/1966 | Jacobson et al. | 29/568 |
| 3,286,344 | 11/1966 | Brainard et al. | 29/568 |
| 3,530,570 | 9/1970 | Shotter | 29/568 |
| 3,161,951 | 12/1964 | Anthony | 29/568 |
| 3,300,856 | 1/1967 | Daugherty | 29/568 |

Primary Examiner—Andrew R. Juhasz
Assistant Examiner—Z. R. Bilinsky
Attorney—Wolfe, Hubbard, Leydig, Voit & Osann

[57] ABSTRACT

An improved shuttle type automatic tool changer is disclosed in the environment of a multi-purpose horizontal spindle machine tool and is adapted to effect the transfer of a succession of tools between a remote tool storage matrix and the machine spindle. The tool changer operates with simple shuttle motions, carrying the tool through a relatively long rectilinear path parallel to the spindle and a substantially shorter orbital path which intersects the axis of the spindle, and utilizing tool handling elements which maintain precise control of the position and orientation of the tool throughout the transfer movement. The tool changer is mounted on the machine tool as a unitary assembly adapted for operation through the numerical control system of the machine.

14 Claims, 23 Drawing Figures

PATENTED SEP 5 1972

INVENTOR.
WILLIAM D. ZETTLER
BY
Wolfe, Hubbard, Leydig, Voit & Osann
ATTORNEYS.

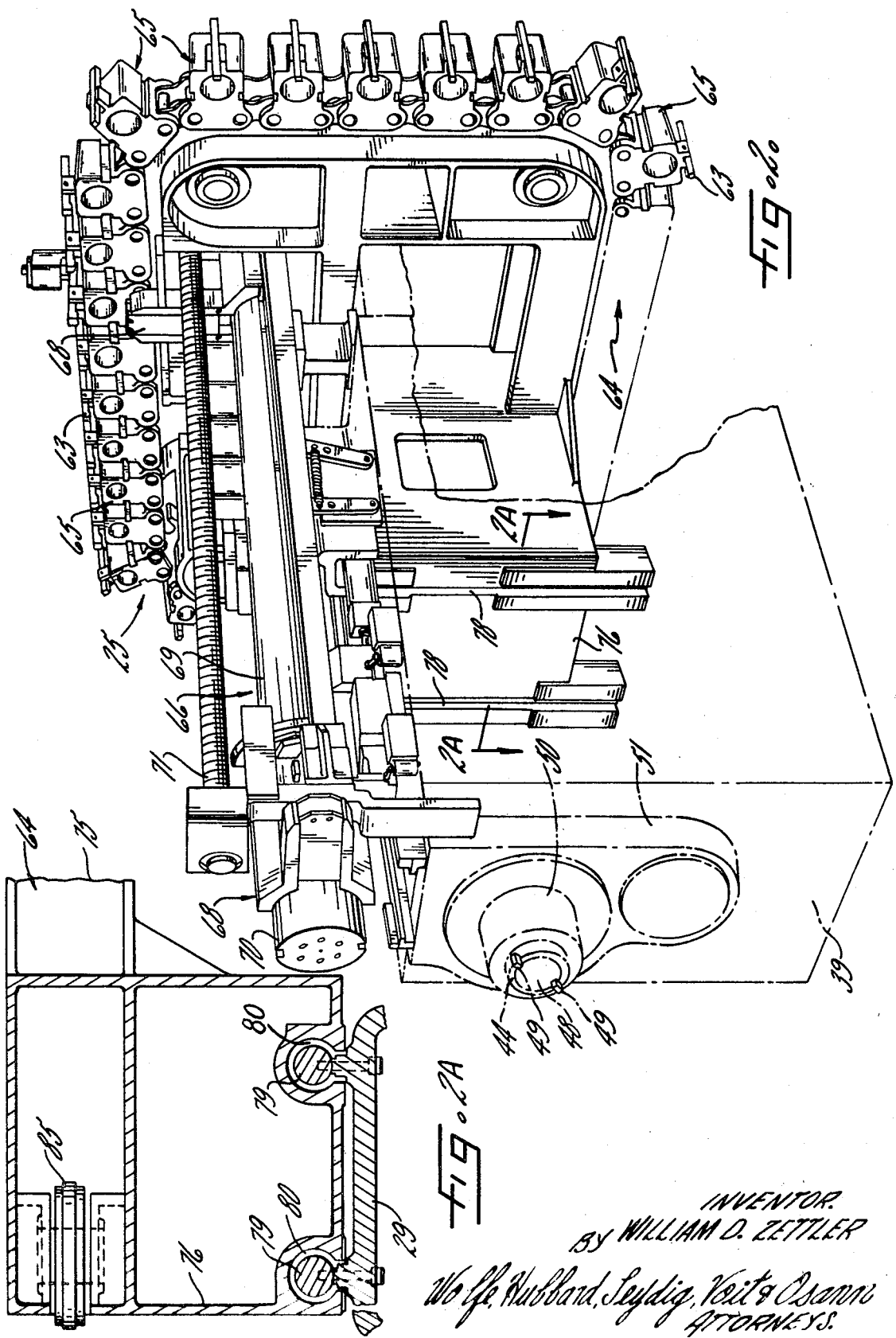

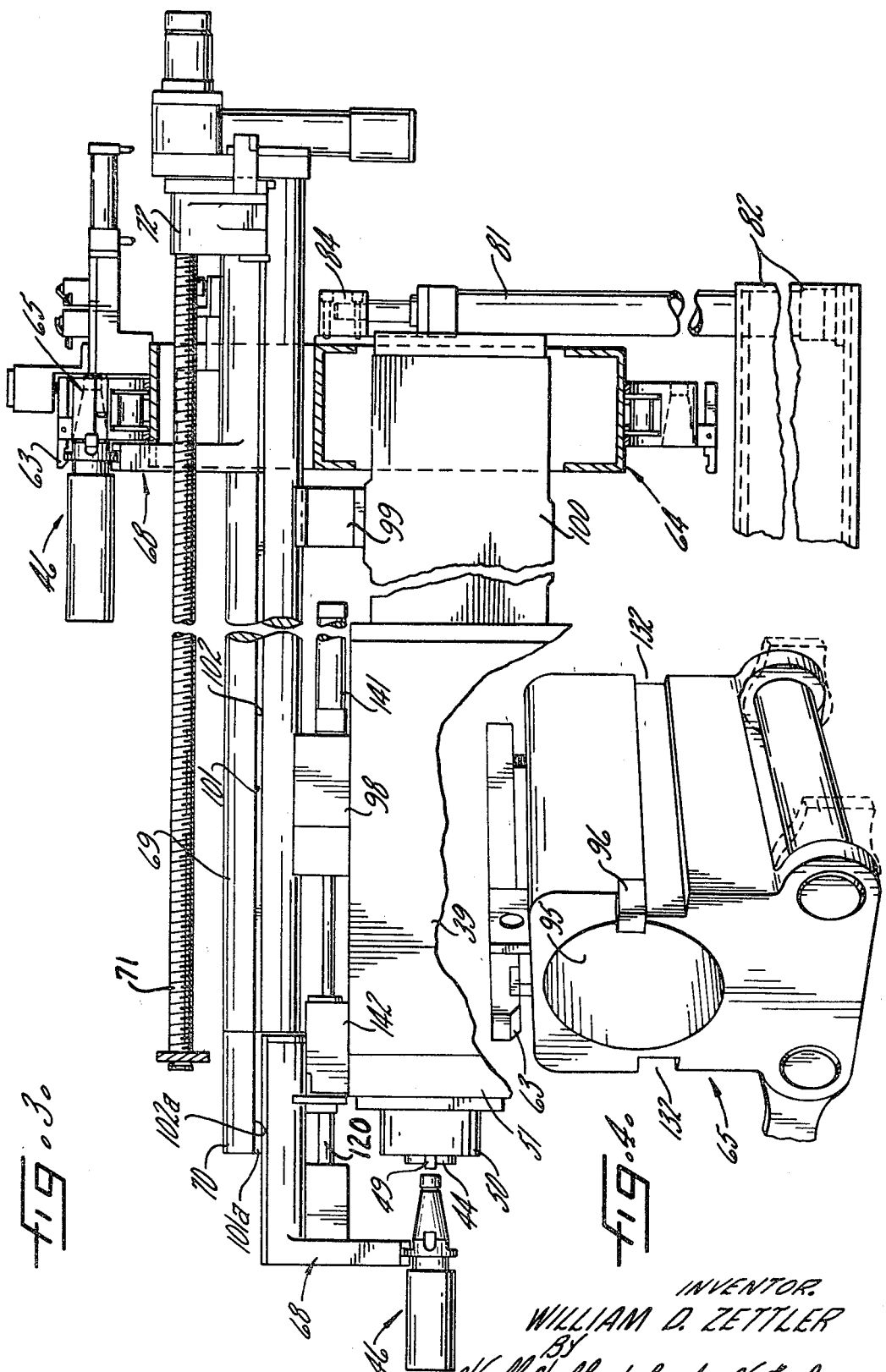

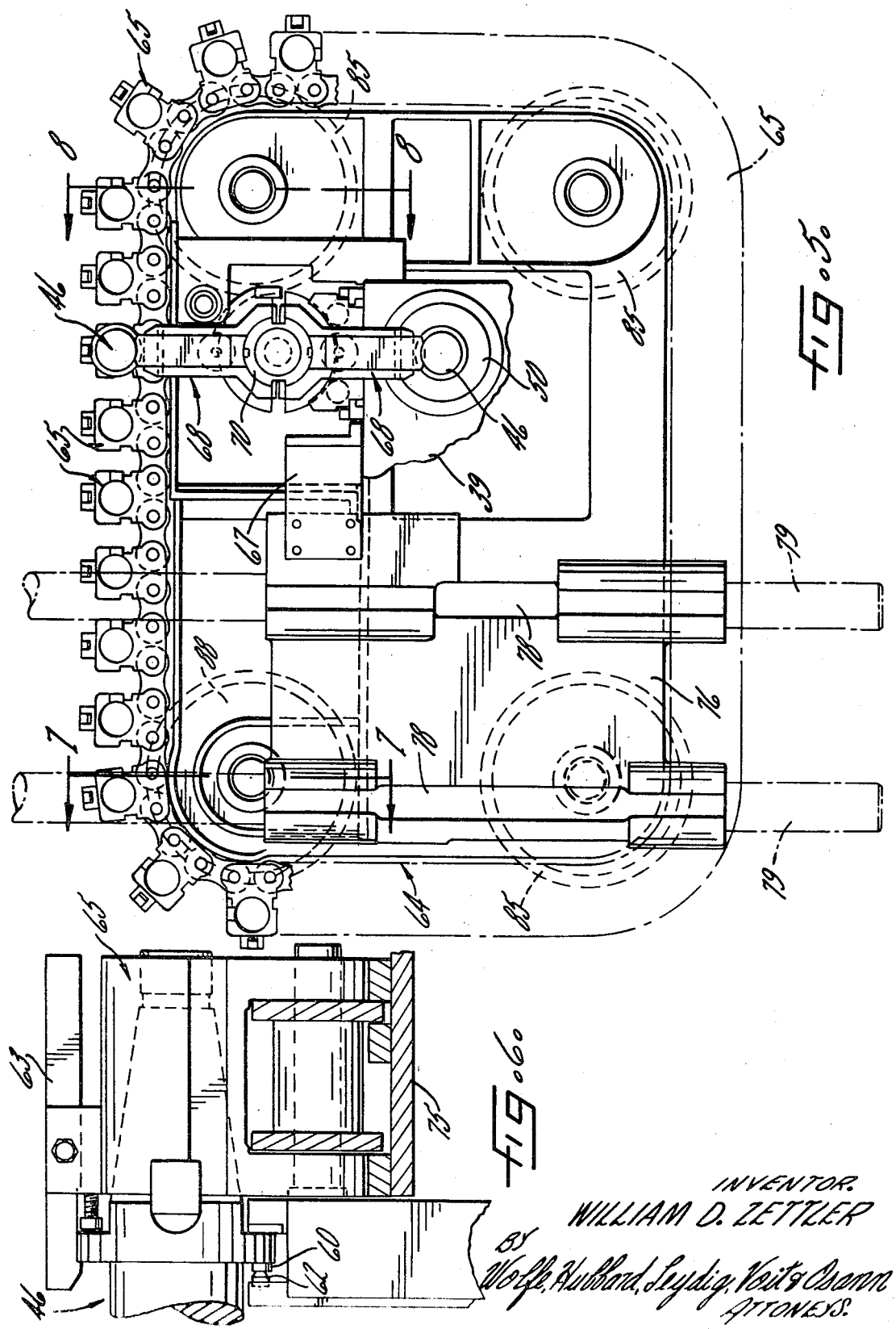

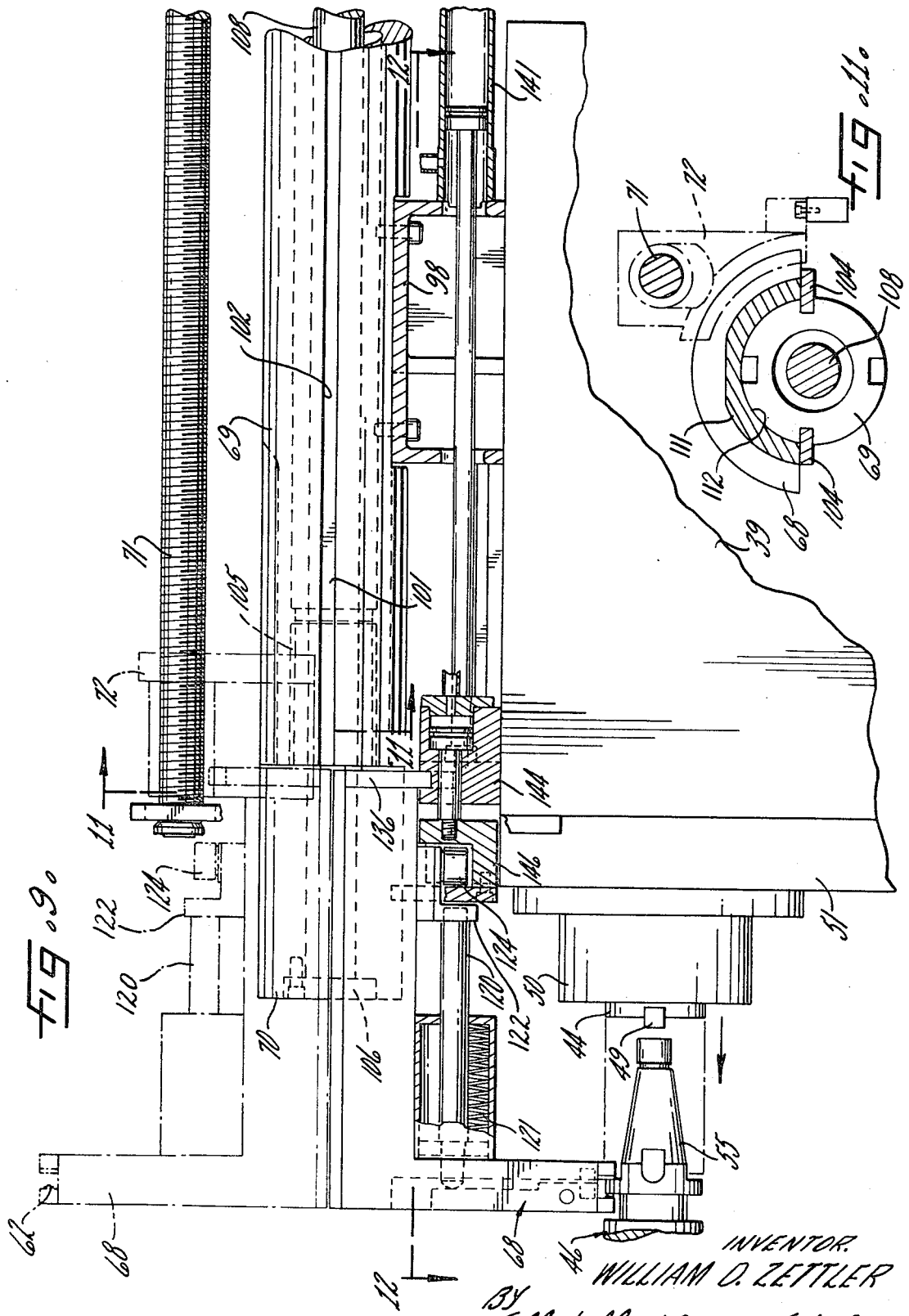

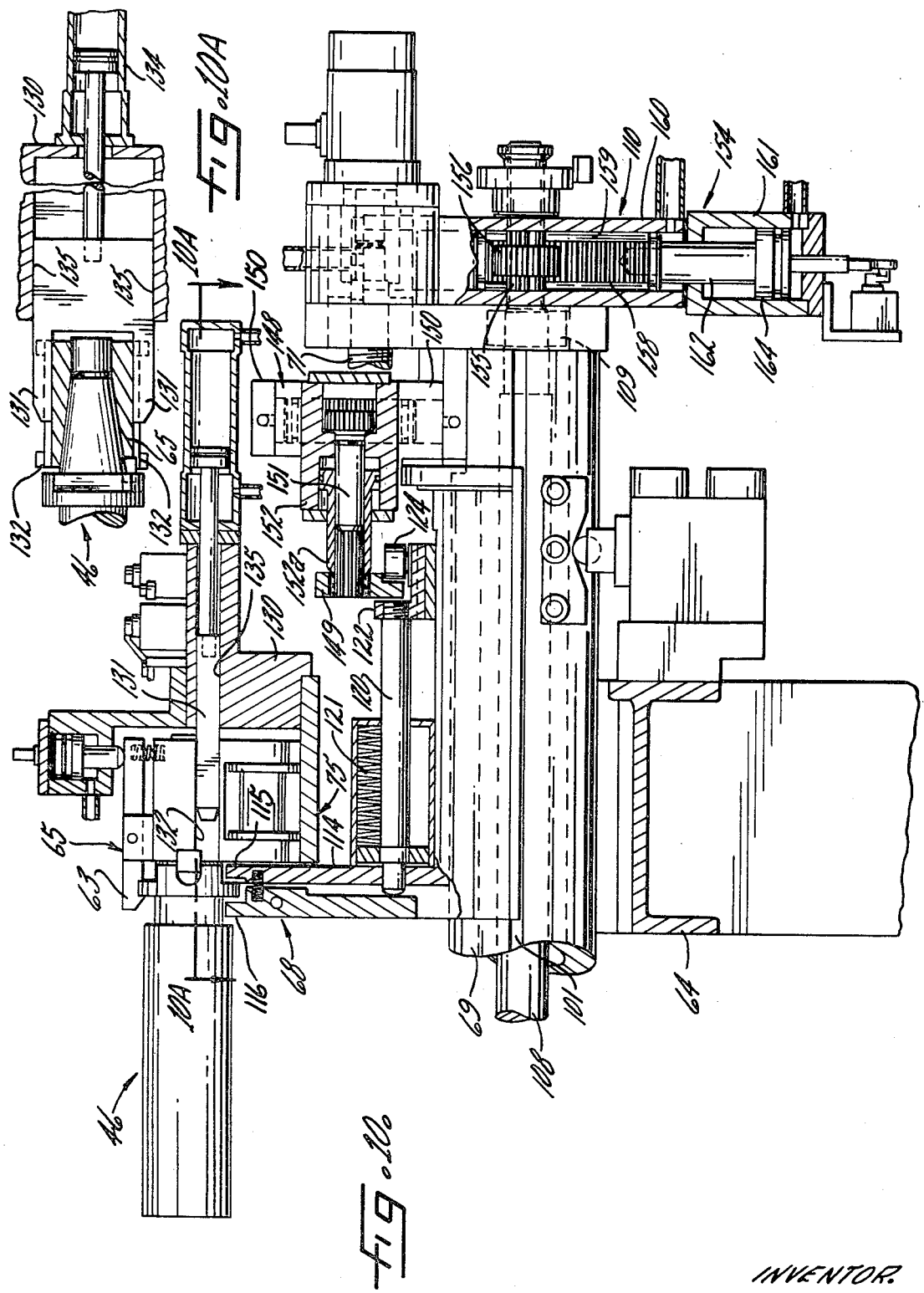

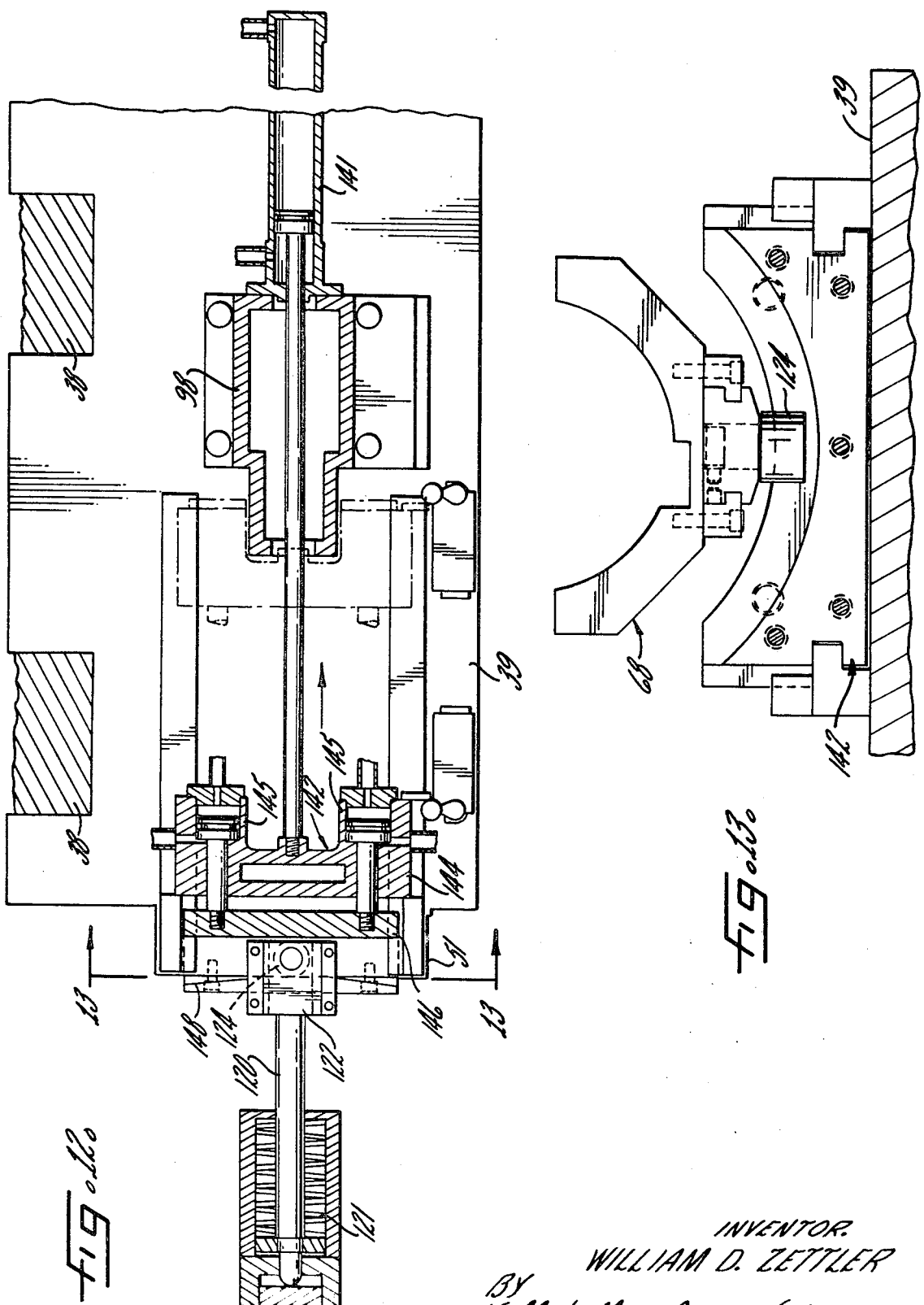

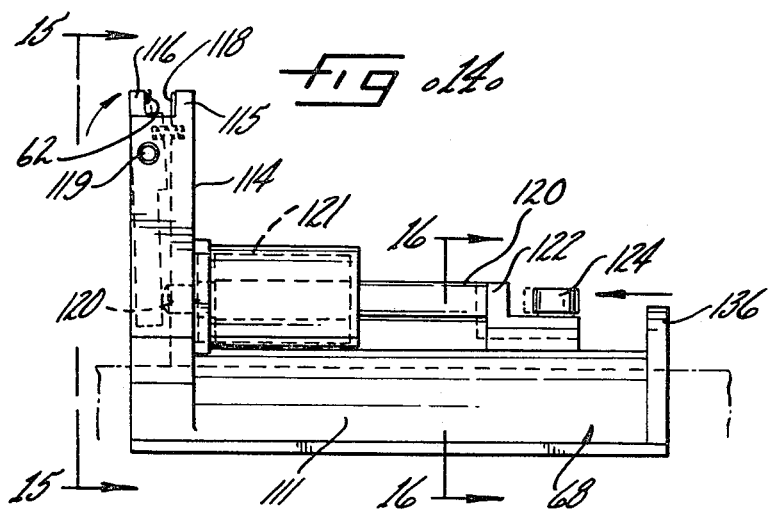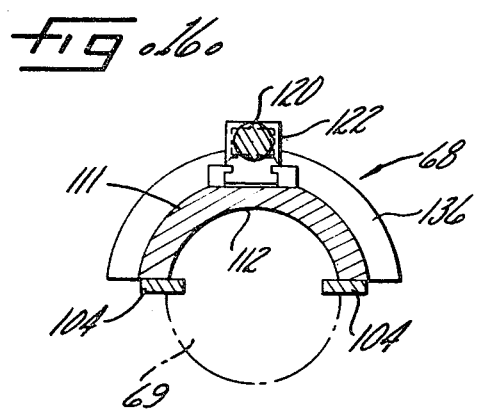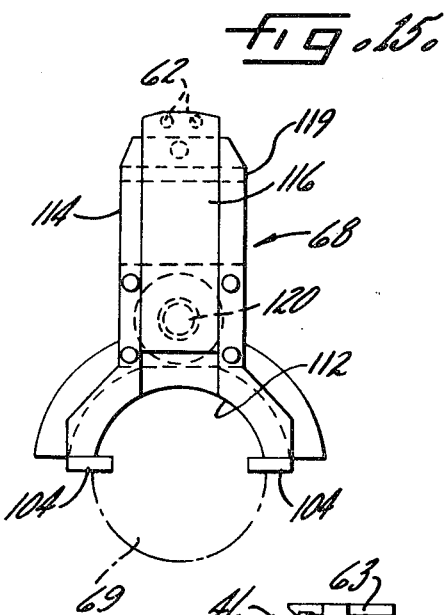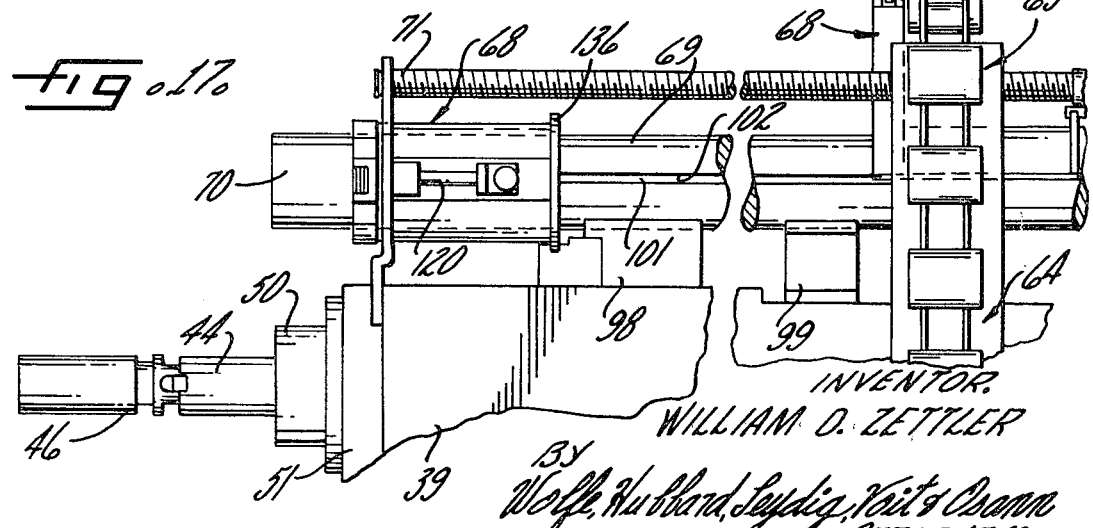

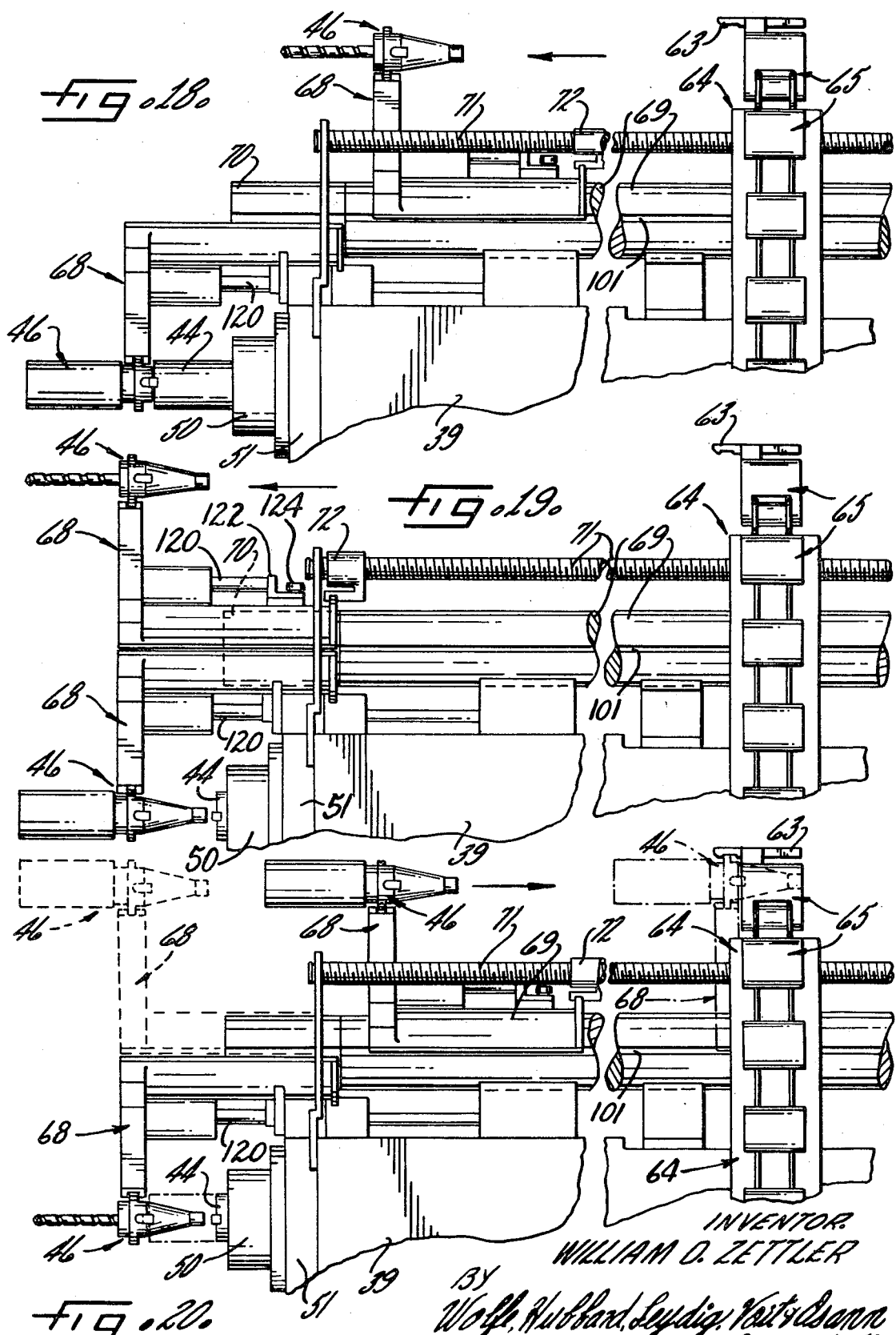

3,688,387

SHUTTLE TYPE AUTOMATIC TOOL CHANGER

DESCRIPTION OF THE INVENTION

The present invention relates to automatic tool changing apparatus for a machine tool wherein a succession of tools is automatically transferred from a storage area to an operating station and subsequently returned to the storage area. More specifically, the present invention relates to an improved automatic tool changer of the shuttle type having a tool storage area located remotely from the operating station and one or more shuttles transporting the tools therebetween. The term "tool," in the context used herein, refers to any one of a variety of cutting tools equipped with a toolholder or adapter of uniform size and configuration.

In a shuttle type automatic tool changer, the operating cycle often involves an initial transfer of a tool from a receptacle in the tool storage matrix to a transport member and one or more subsequent transfers from the transport member to the operating station, as well as the reverse of this sequence. These transfers must be accomplished with a high order of precision and safety, without loss of tool orientation or risk of dropping a tool. They must be executed with complete reliability as often as the machine control calls for a tool change, even after long periods of steady operation.

It is, accordingly, an object of the present invention to provide an improved shuttle type automatic tool changer adapted to transport tools between a tool storage matrix and the machine tool spindle by simple shuttle motion along a rectilinear path parallel to the spindle axis and an orbital path in a plane normal to the spindle axis, maintaining constant, positive engagement with the tool throughout its transport movement.

Another object of the invention is to provide a tool changer of the foregoing type utilizing simple, positively operating shuttles and tool engaging elements which maintain precise control of the position and orientation of the tool during both transfer and transport movement.

A further object is to provide a shuttle type tool changer of the character set forth above and which lends itself to assembly in unitized structural components readily susceptible of installation on a machine such as a horizontal spindle multi-purpose machine tool.

Still another object of the invention is to provide a shuttle type tool changer of the nature above set forth having an improved guiding and counterbalancing arrangement adapted to accommodate variable loads resulting from different assortments of tools in the matrix or shifting tool positions in the same assortment of tools in the matrix.

Other objects and advantages will become apparent as the following description proceeds, taken together with the accompanying drawings wherein:

FIG. 1 is a perspective view of an illustrative horizontal boring, drilling and milling machine embodying a shuttle type automatic tool changer exemplifying the present invention.

FIG. 1A is an enlarged perspective view of an illustrative tool particularly well adapted for operation in the tool changer of FIG. 1.

FIG. 3 is an enlarged, broken side elevational view of the illustrative tool changer of FIG. 1, with certain parts shown in vertical section.

FIG. 4 is a further enlarged perspective view illustrating one of the tool receptacles of the tool storage matrix.

FIG. 5 is an enlarged front elevational view of the tool changer shown in FIG. 1.

FIG. 6 is a further enlarged fragmentary vertical sectional view detailing a tool and toolholding receptacle of the matrix.

Figure 7:
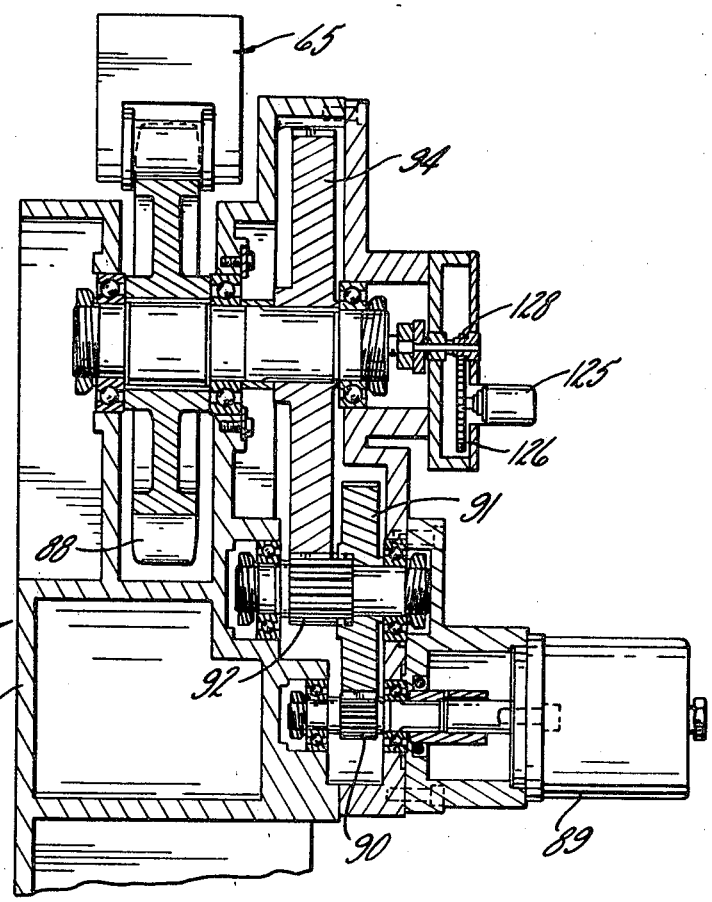
Figure 8:
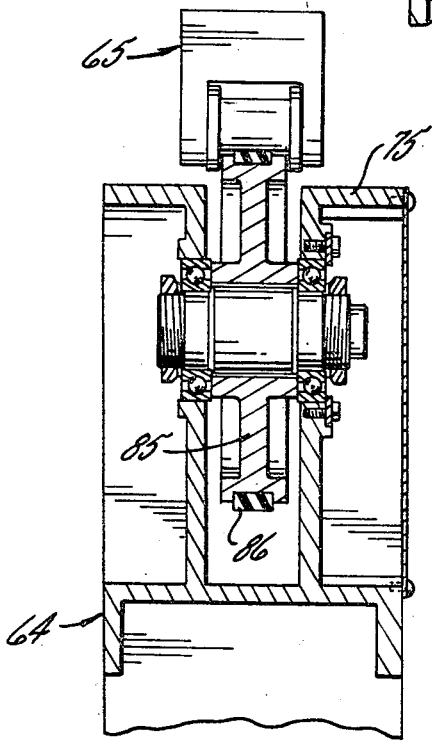

FIGS. 7 and 8 are enlarged fragmentary vertical sectional views taken in the planes of the lines 7—7 and 8—8, respectively, in FIG. 5.

FIGS. 9 and 10 are enlarged broken vertical sectional views taken longitudinally through the tool changer of FIG. 1.

FIG. 10A is a horizontal sectional detail view through the matrix receptacle locating device, taken in the plane of the line 10A—10A in FIG. 10.

FIG. 11 is a transverse sectional view taken in the plane of the line 11—11 in FIG. 9.

FIG. 12 is a horizontal sectional view taken in the plane of the line 12—12 in FIG. 9.

FIG. 13 is a further enlarged vertical secitional view taken in the plane of the line 13—13 in FIG. 12.

FIG. 14 is a side elevational view of one of the shuttles of the tool changer of FIG. 1.

FIG. 15 is a front elevational view of the shuttle, taken from the plane of the line 15—15 in FIG. 14.

FIG. 16 is a vertical sectional view through the shuttle, taken in the plane of the line 16—16 in FIG. 14.

FIGS. 17 through 20 are sequential views of the tool changer of FIG. 1, taken in side elevation and depicting a tool change cycle.

While the invention is susceptible of various modifications and alternative constructions, certain illustrative embodiments have been shown in the drawings and will be described below in considerable detail. It should be understood, however, that there is no intention to limit the invention to the specific forms disclosed but, on the contrary, the intention is to cover all modifications, alternative constructions, and equivalents falling within the spirit and scope of the invention.

GENERAL MACHINE ORGANIZATION

Referring more specifically to FIG. 1, the invention is there exemplified in an illustrative shuttle type automatic tool changer 25 incorporated into a horizontal boring, drilling and milling machine 26. The latter may, for example, be a machine of the type disclosed in U.S. Pat. No. 3,300,856 issued Jan. 31, 1967 on the application of Jesse Daugherty. The tool changer 25 is of the shuttle type and represents an improvement over the apparatus disclosed in U.S. Pat. No. 3,412,459 issued Nov. 26, 1968 on the application of John C. Hollis.

The illustrative machine tool 26 is adapted to be operated by automatic control means or by manual means. Automatic operation may be effected by numerical control from a source of command signals derived, for example, from a magnetic or punched paper tape through a control system 27 connected to operate the various power driven components of the machine. In this manner, the machine 26 equipped with the tool changer 25 is adapted to perform a series of machining operations with interspersed tool changing operations, and to perform both the machining and tool changing operations in a program completely automatic from start to finish.

The machine 26 comprises a bed 28 and an upstanding column 29 rigidly mounted behind the bed toward its left hand side, as viewed in FIG. 1. The bed is formed with a plurality of ways 30 which slidably support a saddle 31. The latter is also formed with ways, enclosed by covers 32, running transversely of the bed ways and slidably supporting a work table 34. In this instance, the work table 34 includes a rotary indexing table 35 which carries a removable pallet 36 with a workpiece W rigidly clamped thereon. The column 29 has a pair of laterally spaced vertical ways 38 fixed to its right hand side. A headstock 39 is slidably mounted on the column ways 38 and vertically positionable at any desired point thereon by means of power driven lead screw 40. Headstock weight is offset by means of a counterbalance within the column connected to the headstock 39 via chain 41 and fixed bracket 42.

An extensible power driven spindle 44, also known as a "live spindle," is rotatably and translatably supported in the headstock 39 (FIGS. 1, 2, 9 and 17). Power is supplied to the headstock by main drive motor 45 mounted in depending relation below it. The spindle 44 is adapted to receive and drive a tool 46 such as the one illustrated in FIG. 1A. For this purpose, the outer end portion of the spindle 44 is formed with a tapered socket 48 and a pair of circumferentially spaced drive keys 49. The spindle also includes a concentrically mounted drawbolt (not shown) for retaining the tool 46 in driving engagement therewith. The spindle is carried by fixed sleeve 50 which projects somewhat beyond a large boss 51 formed in the front face of the headstock.

The tool 46 (FIG. 1A) is illustrative of the large selection of tools adapted for use in the tool changer 25. In the present instance, the tool 46 comprises a milling cutter 52 mounted in a toolholder 54. The latter is formed with a tapered mounting shank 55 adapted to fit the tapered socket 48 of the spindle. The inner end portion 56 of the shank 55 has means such as internal threads for engaging the spindle drawbolt. The tool holder 54 includes a radial flange 58 situated between the cutter 52 and the tapered shank 55. The flange 58 is utilized as a gripping area for handling the tool. It includes a pair of diametrically opposed, circumferentially spaced recesses 59 adapted to received and engage the spindle drive keys 49. The gripping flange 58 includes a pair of laterally spaced bushings 60 having frusto-conical recesses 61 which are adapted to register with correspondingly spaced teeth 62 in the gripping devices of the tool changer. This permits positive, precise positioning and orientation of the tool in the gripping device.

Another function of the toolholder flange 58 is to provide a simple, effective means for latching the tool 46 in the toolholder receptacle of the matrix 64. In this instance, the latching area is situated on that part of the flange 58 diametrically opposite the positioning bushings 60. With the tool 46 in a matrix receptacle, the latching area is situated toward the outside of the matrix where it is engaged by a releasable latching element 63.

The automatic tool changer 25 (FIGS. 2,3,4,9 and 10) comprises a tool storage matrix 64 adapted to hold an assortment of tools 46 in storage receptacles 65; a tool shuttle system 66 which includes a pair of shuttles 68 selectively translatable along a generally cylindrical track 69 and rotatable turret 70 between a rearward position where tools are transferrable between the matrix and the shuttles and a forward position where tools are transferrable between the spindle and the shuttles; and matrix and shuttle transfer devices which maintain precise control over the position and orientation of the tool during transfer as well as transport. The live headstock spindle 44 is utilized as one of the shuttle transfer devices in that it is adapted to be oriented in a predetermined angular position and translated axially to receive or present a tool to the shuttles.

The matrix 64 is supported for generally orbital movement about the axis of the spindle 44 and is vertically positionable in unison with the headstock, being coupled thereto by a direct mechanical connection such as bracket 67 (FIG. 5). The storage receptacles 65 are fashioned as links in a massive roller chain which may be indexed so as to present any selected tool at the rearward transfer position for presentation to one of the shuttles 68. The latter, with the new selected tool, is adapted to be traversed individually along the track 69 and onto the rotatable turret 70 by means of a power driven lead screw 71 and drive nut 72. Prior to entry of the shuttle and new tool onto the turret, the spindle 44 and the old tool move axially outward to forward transfer position. The other shuttle moves axially forward on the turret 70 and the latter is indexed through 90°, carrying the other shuttle from its park position shown in FIGS. 1,2 and 17 into gripping engagement with the old tool in the spindle. The latter then retracts, permitting the turret 70 and both shuttles to index through 180°. The spindle then moves to forward transfer position engaging the new took, the shuttle with the old tool returns to the matrix which meanwhile indexes to bring the old tool's receptacle to rearward transfer position to receive it, and the other shuttle indexes through 90° and moves axially rearward on the turret to park position.

TOOL STORAGE MATRIX

Figure 2:
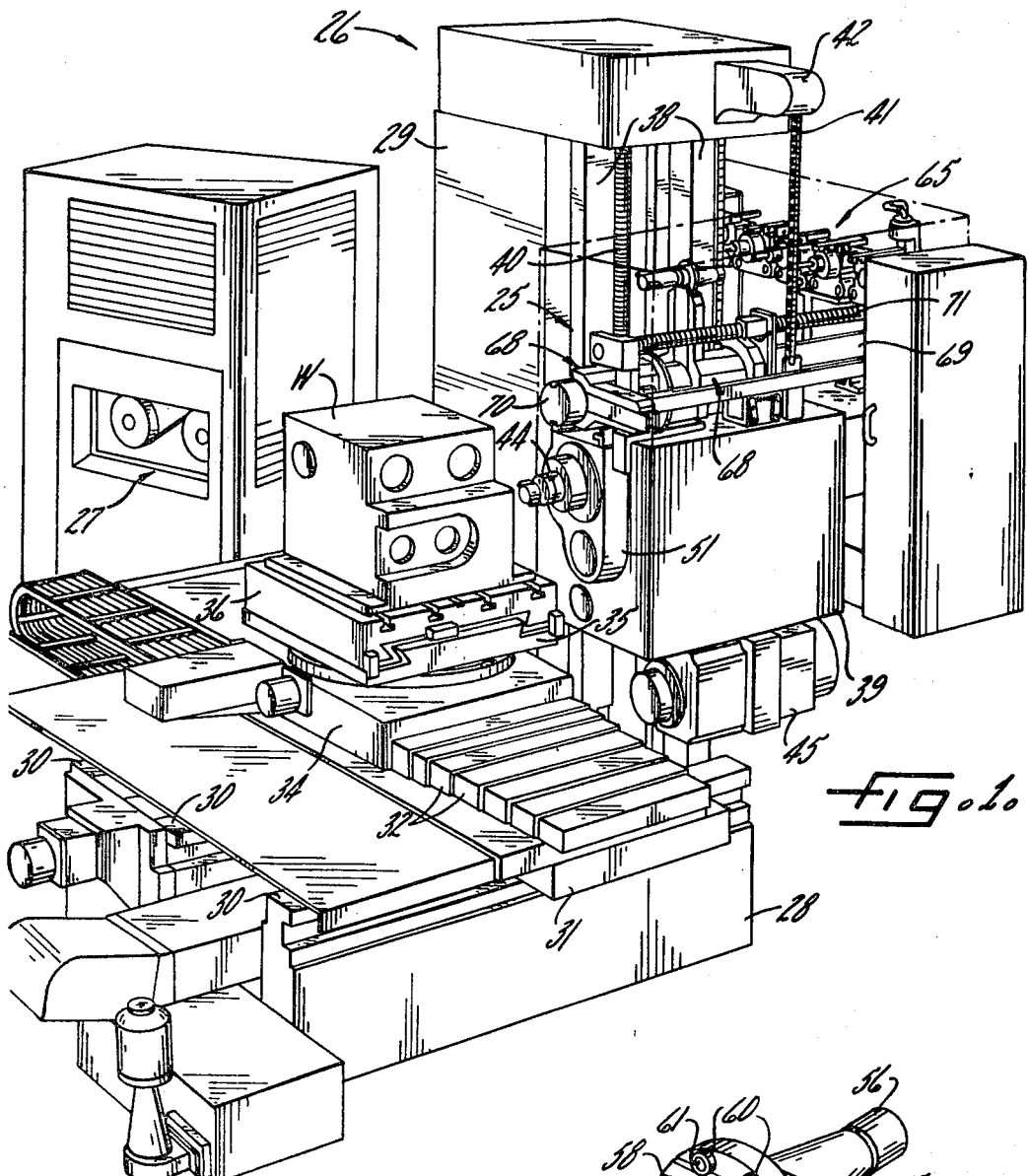
FIG. 2 is an enlarged perspective view showing the principal structure components of the automatic tool changer of FIG. 1, with certain of the related machine tool components shown in phantom outline.
Figure 2A:
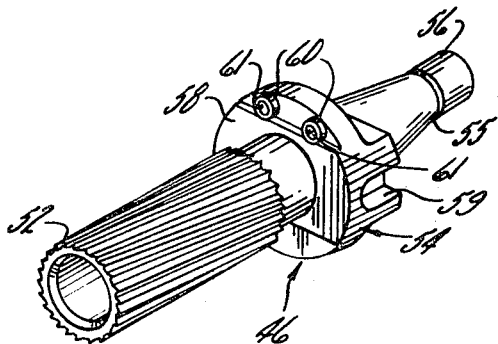
FIG. 2A is an enlarged horizontal sectional view through the matrix saddle and a portion of the column, taken in the plane of the line 2A—2A in FIG. 2.

The tool storage matrix 64 (FIGS. 2,3,5 and 10) is assembled upon a matrix saddle 75 in the form of a hollow ribbed frame of generally rectangular configuration with rounded corners. The matrix saddle 75 includes a forwardly extending bracket 76 which nests adjacent the column 29 on one side of the headstock. The front face of the bracket 76 has a pair of laterally spaced slots 78 which engage a pair of corresponding round ways 79 running vertically of the rear wall of the column (FIGS. 2, 2A and 5). Ball sleeves 80 with the slots 78 slidably engage the ways 79.

By reason of its direct connection with the headstock 39 through the bracket 67, the matrix 64 is counterbalanced by the headstock counterbalancing system through chain 41 (FIG. 1). To accommodate varying tool loads and compensate for rearward overhang, the matrix is provided with a supplemental counterbalance in the form of hydraulic actuator 81 (FIG. 3). The latter is disposed between fixed bracket 82 extending rearwardly from the base of the column 29 and a mounting block 84 fixed to the rear central portion of the magazine saddle.

The matrix receptacles 65, which consist of alternate links in a massive roller chain, are trained around the outer peripheral surface of the matrix saddle 75. The chain and matrix receptacles are guided by three sheaves 85 which have resilient peripheral elements 86 engaging the chain. The latter is driven by means of a toothed drive sprocket 88 which, in turn, is powered by matrix drive motor 89 through suitable reduction gearing 90, 91, 92 and 94. The sheaves 85 and drive sprocket 88 are journaled in suitable bearings in the matrix saddle and project sufficiently along its outer periphery to provide running clearance for the chain matrix.

Each matrix receptacle 65 is formed with a tapered tool receiving aperture 95 conforming generally to the tapered tool receiving recess in the spindle 44. A locating key 96 is fixed adjacent the front of each receptacle and is adapted to engage one of the recesses 59 in the flange of the tool 46 to maintain proper tool orientation.

TOOL SHUTTLE SYSTEM

As indicated earlier herein, the tool shuttle system 66 comprises shuttles 68, cylindrical track 69 and rotatable turret 70. The track 69 is rigidly supported on the top surface of the headstock 39 by an adapter block 98 and a bracket 99 extending between the track and ram guide housing 100, a rearward extension of the headstock housing. The track is formed with diametrically opposed longitudinal guide slots 101, defining therebetween a pair of semi-cylindrical slideway bearings each adapted to receive a complemental guide bearing surface of a shuttle. The slots 101 define downwardly facing surfaces 102 adapted to slidably engage retainer plates 104 of the shuttles.

The rotatable turret 70 (FIGS. 9 and 10) is comparable in cross section to the track 69, being journaled on its forward end by means of an integral sleeve 105 of lesser diameter telescoping axially into the track 69. It is retained in place by means of the flanged outer end 106 of indexing shaft 108 and nut 109 adjacent the rearward end of the latter. The shaft 108 is also connected at its rearward end to an indexing motor 110 of the hydraulic type.

The indexible turret 70 projects beyond the front face of the headstock 39. It is formed with a pair of diametrically opposed slots 101a defining guide surfaces 102a and 102b which are adapted to engage the retainer plates 104 of the shuttles. The turret is rotatable to selectively align either one of the surfaces 102a or 102b with the surface 102 of the track.

Each of the shuttles 68 (FIGS. 11, 15, 16) has an elongated body 111 formed with a slide bearing surface 112, cylindrical in cross section and complemental to the surface of the track 69 and to both sides of the indexible turret section 70. The outer end of each shuttle is formed with a laterally extending tool support arm 114 which carries tool gripping jaws 115 and 116 similar to those disclosed in U.S. Pat. No. 3,344,511 issued Oct. 3, 1967 on the application of Everett E. Hosea. Jaw 115 is rigid with the arm by a pivot pin 119 and is provided with tool engaging teeth 62 facing the surface 118. The jaw 116 is normally biased to a closed or clamped position by a plunger 120, one end of which is urged against the inner end of the jaw 116 by a Belville type spring assembly 121. The other (inner) end of the plunger 120 is supported in a guide assembly 122 mounted on the shuttle body 111. The assembly 122 includes a cam roller 124 attached to the plunger, and which, when cammed to the right as viewed in FIG. 14, serves to open or unclamp the jaw 116.

MATRIX AND SHUTTLE TRANSFER DEVICES

The tool changer 25 is provided with a number of devices to maintain precise control of the position and orientation of the tool during transfer to and from the shuttles as well as during transport of the tool on each shuttle. In keeping with this object, the matrix includes a position signal generator resolver 125 geared to the drive sprocket 88 through reduction gearing 126, 128 (FIG. 7). The feedback from the resolver 125 facilitates precise positioning of a selected matrix tool receptacle 65 during final indexing movement.

The final and accurate positioning of the selected receptacle 65 is established by a shot pin unit 130 located at the rearward transfer position at the matrix and supported on the matrix saddle 75 (FIGS. 10, 10A). The shot pin is formed with a pair of precisely spaced fingers 131 adapted to engage a pair of slots 132 formed on opposite sides of the receptacle 65 (FIG. 4). The projecting ends of the fingers are tapered to facilitate entry into the slots and to cam the receptacle into position if necessary. The shot pin will also serve to bring the receptacle to a true angular position when a heavy overhanging tool might cause the receptacle to tilt. The shot pin is operated by a hydraulic cylinder 134 for movement along supporting guideways 135.

Turning now to the shuttle transfer devices, it will be noted that the indexible turret 70 is adapted to receive both shuttles simultaneously (FIGS. 9, 19). When received, the turret is indexed 180° to provide for an interchange of the shuttles between a shuttle traverse position and a shuttle to spindle tool transfer position. Indexing of the turret section 70 brings a flange 136 of the upper shuttle body into engagement with a yoke 138 formed on a nut 139 carried by a screw 140. The lower shuttle is moveable between a parked position for storage or arm extended position for tool exchange by a hydraulic cylinder 141, the body of which is secured to the block 98. A slide 142 (FIGS. 9 and 12), reciprocably supported on the top surface of the headstock, is formed with a first yoke 144 adapted to receive the flange 136 to provide a drive connection between the parking cylinder 141 and the shuttle. The slide assembly carries a pair of short stroke hydraulic cylinders 145 connected to a second yoke 146 adapted to engage the cam roller 124 of the guide assembly 122. Operation of the short stroke cylinders 145 to move the yoke 146 to its rearward position serves to move the jaw 116 to its open or tool release position.

The yoke 146 includes a cam surface 148 adapted to engage the cam roller 124 to move the jaw 116 to its open position when the shuttle is moved from a parked position to a tool pickup position at the spindle. In this case the yoke is located at its inward position prior to indexing of the shuttle. Then as the shuttle is indexed the roller 124 engages the cam surface of the yoke 146 and the jaw 116 is opened before it envelops the tool flange. To clamp the tool to the shuttle it is then necessary to move the second yoke to its outer position, thereby releasing the plunger 120 to apply the spring bias to the jaw 116.

When the shuttle is located at its rearward position on the track 69, the jaw 116 is adapted to be operated by an actuator assembly 148 supported on the end of the track (FIG. 10). The assembly includes a latch 149 supported for pivotal motion to releasably engage the roller 124 and for motion parallel to the track to operate the plunger 120. A first hydraulic cylinder 150 serves to rotate a pinion shaft 151 through an angle of 90° while a second cylinder 152 which includes a piston rod 152a serves to move the latch in a direction parallel to the track for operating the shuttle to clamp.

The forward turret 70 of the track is indexed by a hydraulically operated unit 154 secured to the end of the track. Referring once more to FIG. 10, it will be noted that the drive shaft 108 extends rearwardly of the track. The rearward end of the shaft is formed with spline tooth portion 155 which supports a drive pinion 156. The pinion has engagement with a rack gear 158 formed on a double-acting piston 159 of a hydraulic cylinder 160. The travel of the piston in the cylinder 160 is determined by abutment of the ends of the piston with the ends of the cylinder. This travel provides for movement of the rack gear 158 to effect 180° of rotation of the pinion 156 and thus also the turret 70 of the track. Thus the two shuttles when on the turret of the track are indexible through 180°.

A second double acting hydraulic cylinder 161 is mounted coaxially of the cylinder 160. It has a piston rod 162 which projects through one end of the cylinder 160 for end abutting engagement with the piston 159. The piston 164 of cylinder 161 is moveable between limits established by the length of the cylinder. When the piston rod 162 is fully retracted within the cylinder 161, the piston 159 is free to operate the turret 70 through an angle of 180°. Such movement is effective to transfer shuttles between vertical upwardly and downwardly extending positions.

With the piston rod 162 fully extended into the cylinder 160, the travel of the rack on piston 159 is limited so that indexing of the turret 70 is limited to 90°. This condition is required for moving the downwardly extending shuttle to a parked position after having deposited a tool in the spindle.

I claim as my invention:

1. In an automatic tool changing apparatus for a machine tool wherein a succession of tools is transferred between a storage area and an operating station, said tools each having a tool adaptor with a radial gripping flange perpendicular to the axis of said tool, the combination comprising:
   a. a tool storage matrix,
   b. a stationary shuttle track of generally cylindrical cross section,
   c. a rotatable turret journaled on one end of said track in alinement therewith and of substantially identical cross section,
   d. said track and said turret being disposed between a rearward tool transfer position adjacent said matrix and a forward tool transfer position adjacent said spindle,
   e. said track and turret each having its outer periphery formed with a pair of longitudinal extending guide slots,
   f. a pair of identical tool carrying shuttles mounted on said track and said turret for movement axially thereof,
   g. said shuttles each having retainer plates for slidably engaging said track and turret guide slots,
   h. tool gripping means on said shuttles,
   (i) said tool gripping means for each shuttle including a pair of axially opposed gripping jaws capable of gripping the radial flange of a tool adaptor, one jaw of each of said pair being movable relative to the other between an open tool adapter releasing and receiving position and a closed tool adapter engaging position,
   j. power driven means for traversing said shuttles axially of said track and said turret,
   k. power driven means for rotatably indexing said turret and shuttles through 180°,
   l. cam means engageable with each tool shuttle at the forward tool transfer position for actuating said tool gripping means of said shuttle,
   m. and means for actuating said tool gripping means of said shuttles at said rearward tool transfer position.

2. An automatic tool changing apparatus as set forth in claim 1, wherein said power driven means is adapted to index said turret selectively through 90° or 180°.

3. An automatic tool changing apparatus as set forth in claim 1 wherein said track has a pair of semi-cylindrical guide bearing surfaces between said slots and said shuttles have corresponding bearing surfaces complemental therewith.

4. In an automatic tool changing apparatus for a machine tool wherein a succession of tools is transferred between a storage area and an operating station, the combination comprising:
   a. a tool storage matrix,
   b. a shuttle track,
   c. a rotatable turret journaled on one end of said track in alinement therewith,
   d. said track and said turret being disposed between a rearward tool transfer position adjacent said matrix and a forward tool transfer position adjacent said spindle,
   e. a pair of identical tool carrying shuttles mounted on said track and said turret for movement axially thereof,
   f. tool gripping means on each of said shuttles,
   g. said tool gripping means including a pair of axially opposed gripping jaws, one jaw of each of said pair being movable relative to the other between an open tool releasing and receiving position and a closed tool engaging position,
   h. means for rotatably indexing said turret and shuttles through 180°,
   i. and cam means at said forward tool transfer position engageable with each shuttle adjacent said spindle for actuating the movable tool gripping jaw of each shuttle from a closed position to an open tool receiving position as an incident to rotary indexing said turret and the shuttle mounted thereon to a predetermined angular position.

5. An automatic tool changing apparatus as set forth in claim 1 wherein said track guide slots each have a width which is substantially the same as the thickness of one of said shuttle retainer plates, said turret guide slots each having a width which is substantially equal to the thickness of two of said shuttle guide plates so that said pair of shuttles may be located in opposed relation at the same axial position on said shuttle, and said turret being selectively rotatable to align one half of said turret guide slots with said track guide slots to permit the transfer of one shuttle from said turret onto said track while the other shuttle remains on said turret.

6. An automatic tool changing apparatus as set forth in claim 1 wherein one side of each of said track guide slots defines a guide surface, said track guide surfaces being engaged by the retainer plates of a shuttle that is moved along said track, said turret guide slots each defining first and second guide surfaces, said first guide surfaces being capable of retaining the retainer plates of one of said shuttles simultaneously while said second guide surfaces retain the retainer plates of the other shuttle so that said shuttles may be supported on said turret in opposed relation, and said turret being selectively rotatable to align either said first guide surfaces or said second guide surfaces with said track guide surfaces to permit axial movement of the shuttle retained by the respective guide surfaces onto said track.

7. An automatic tool changing apparatus as set forth in claim 1 wherein said power driven turret indexing means includes a drive motor disposed at the rearward end of said track and a drive shaft extending coaxially through said track connecting said drive motor and turret.

8. An automatic tool changer apparatus as defined in claim 4 including means at the rearward tool transfer position for selectively opening and closing the movable tool gripping jaw of each of said shuttles when the shuttle is mounted at said rearward tool transfer position.

9. An automatic tool changer as defined in claim 4 including a cam follower mounted on each of said shuttles, said cam follower being engageable with said cam means when said shuttle is indexed to a predetermined position.

10. An automatic tool changer apparatus as defined in claim 9 wherein said cam means is included as part of a yoke assembly, and including means for selectively translating said yoke assembly relative to said headstock to close the movable jaw of each shuttle to its tool engaging position after said shuttle has been indexed to said predetermined position.

11. An automatic tool changer apparatus as defined in claim 10 wherein said yoke assembly is mounted in a movable slide, each shuttle being engageable with said slide upon being indexed by said turret to a preselected position, and means for moving said slide to axially translate a shuttle engaged therewith between a forward tool transfer position and a park position.

12. An automatic tool changing apparatus as defined in claim 9 in which said cam follower means is a roller, and said cam means is a plate which defines a camming surface.

13. An automatic tool changer apparatus as defined in claim 4 in which said track is cylindrically shaped, and said indexing means including a drive motor located at the rearward end of said track and a drive shaft extending coaxially through said cylindrical track connecting said drive motor and said turret.

14. In an automatic tool changing apparatus for a machine tool wherein a succession of tools is transferred between a storage area and an operating station, said tools each having a tool adaptor with a radial gripping flange perpendicular to the axis of said tool, the combination comprising:
a. a tool storage matrix,
b. a shuttle track,
c. a rotatable turret journaled on one end of said track in alinement therewith,
d. said track and said turret being disposed between a rearward tool transfer position adjacent said matrix and a forward tool transfer position adjacent said spindle,
e. a pair of identical tool carrying shuttles mounted on said track and said turret for movement axially thereof,
f. means for rotatably indexing said turret and shuttles through 180°,
g. tool gripping means on each of said shuttles,
h. said tool gripping means for each shuttle including a pair of axially opposed gripping jaws capable of gripping the radial flange of a tool adaptor, one jaw of each said pair being movable relative to the other between an open tool adaptor releasing and receiving position and a closed tool adaptor engaging position.
i. cam follower means mounted on each of said shuttles,
j. means connecting the cam means of each shuttle to said movable jaw,
k. means at said forward tool transfer position for actuating the cam follower means of each shuttle to open and close the movable jaw of each shuttle when said shuttle is located at said forward position, and
l. means at said rearward tool transfer position for actuating the cam follower means of each shuttle to open and close the movable jaw of each shuttle when said shuttle is located at said rearward position.

* * * * *